United States Patent
Murakami et al.

[11] Patent Number: 5,942,603
[45] Date of Patent: Aug. 24, 1999

[54] THERMALLY STABLE CRYSTAL MODIFICATION OF DYESTUFF, PROCESS FOR PRODUCTION THEREOF, AND METHOD OF DYEING HYDROPHOBIC FIBER WITH IT

[75] Inventors: Yasuo Murakami, Kawaguchi; Yoshiki Akatani, Urawa, both of Japan

[73] Assignee: Nippon Kayaku Co., Ltd., Tokyo, Japan

[21] Appl. No.: 08/952,401

[22] PCT Filed: Mar. 19, 1997

[86] PCT No.: PCT/JP97/00921

§ 371 Date: Dec. 11, 1997

§ 102(e) Date: Dec. 11, 1997

[87] PCT Pub. No.: WO97/34955

PCT Pub. Date: Sep. 25, 1997

[30] Foreign Application Priority Data

Mar. 19, 1996 [JP] Japan ................................. 8-088968

[51] Int. Cl.$^6$ ........................... C09B 67/48; C09B 67/22; D06P 1/18
[52] U.S. Cl. ............................. 534/575; 534/850; 8/639; 8/922
[58] Field of Search ..................... 534/575, 850; 8/639, 922

[56] References Cited

U.S. PATENT DOCUMENTS

| | | | |
|---|---|---|---|
| 4,960,435 | 10/1990 | Tunoda et al. | 534/575 X |
| 4,985,043 | 1/1991 | Buhler et al. | 534/575 X |
| 5,532,344 | 7/1996 | Himeno et al. | 534/575 X |

FOREIGN PATENT DOCUMENTS

| | | |
|---|---|---|
| 0 030 291 | 11/1980 | European Pat. Off. . |
| 0 489 924 | 6/1992 | European Pat. Off. . |
| 802239 | 10/1997 | European Pat. Off. . |
| 3-265666 | 11/1991 | Japan . |
| 7-304990 | 11/1995 | Japan . |
| 1152317 | 5/1969 | United Kingdom . |
| 2 123 845 | 2/1984 | United Kingdom . |

*Primary Examiner*—Fiona T. Powers
*Attorney, Agent, or Firm*—Nields, Lemack & Dingman

[57] ABSTRACT

This invention related to a novel β-crystal of the compound represented by the following formula (1),

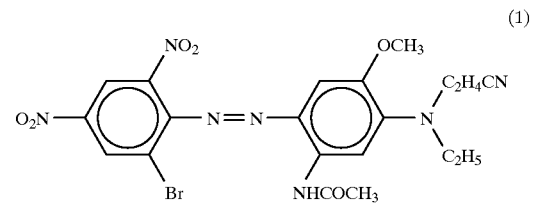

which is useful as a dyestuff. The β-crystal of this invention is characterized by being stable in high temperature and having sharp peaks in the powder X-ray diffractometry.

This invention is related to a process for producing a said β-crystal, said process comprising heating a known thermally unstable α-crystal at a temperature higher than 15° C., preferably higher than 40° C. in water, a water-soluble organic solvent, or a solvent comprising water containing an anionic or nonionic surface active agent.

Furthermore, this invention is related to a dyestuff composition containing of the said β-crystal, and a process for dyeing comprising employing the said β-crystal.

9 Claims, 3 Drawing Sheets

THERMALLY STABLE CRYSTAL MODIFICATION OF DYESTUFF, PROCESS FOR PRODUCTION THEREOF, AND METHOD OF DYEING HYDROPHOBIC FIBER WITH IT

TECHNICAL FIELD OF THE INVENTION

The present invention relates to a compound having a novel type of crystal, a thermally stable crystal modification of disperse dye, a process for producing thereof, and a process of dyeing with it.

PRIOR ART

A compound represented by the following formula (1) known as a useful compound for dyestuff (Japanese Patent Publication No. 12035/1970).

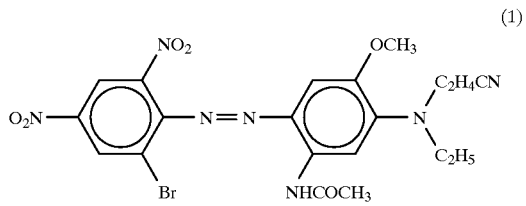

It is known that the dyestuff composition comprising the compound represented by the above formula (1) is capable of dyeing synthetic fiber such as polyester fiber in dark blue. As the results of recent streamlining and energy saving in the dyeing industry, it has become common practice to reduce a liquor ratio and to employ a process that the dispersed dye liquor is forced to circulate through a stationary substrate, such as Obermaier dyeing, cheese dyeing, beam dyeing, and other liquor flow dyeing. These dyeing processes need development of a dyestuff having an excellent dispersion stability at a high temperature for prevention of unequal dyeing by such filter effect.

As shown in FIG. 3, only amorphous type's compound, as the compound represented by the formula (1), having dull peaks of the diffraction pattern in the X-ray diffractometry of Cu-Kα line is known. In the present application, "α-crystal" means a well known amorphous type of the compound represented by the formula (1) and "β-crystal" means a novel crystal modification of the compound of the present invention hereinafter in order to simplify descriptions.

In the case that α-crystal is used as a dyestuff, the dyestuff is manufactured by mechanical grinding by a sand-mill together with a dispersing agent such as sodium salt of naphthalenesulfonic acid-formalin condensate or sodium lignin sulfonate as usual process for producing a dispersed dyestuff composition, and then the dyestuff composition is provided in order to dye fabrics of polyester fiber or blended woven fabrics of polyester fiber and polyacrylate fiber or cotton. However, particles of the dyestuff composition form a tar-like substance or coagulation which is formed by destroying of dispersion state because α-crystal does not have a thermal stability at a temperature of 95–135° C. at which dyeing is performed on polyester fiber. The forming of such a tar-like substance and coagulated particles of a dyestuff hinder even dyeing. Particularly, in Obermaier dyeing, cheese dyeing, beam dyeing and liquor flow dyeing, since it is difficult that the coagulated particles pass through yarn or fiber layers, the particles cause clogging, failure of internal penetration, casng spot and so on and also cause not only hindering even dyeing but also deteriorating fastness of dyed substrates.

Therefore, when α-crystal of the compound represented by the formula (1), which is prepared in the well-known and usual way, is used as a dyestuff for dyeing, dispersion state of dyestuff particle in a dye bath becomes poor and such poverty in dispersion state prevents us from obtaining substrates dyed evenly.

DISCLOSURE OF THE INVENTION

As the result of that the present inventors studied earnestly in order to overcome the above-described problems, we have found that β-crystal has a stability at high temperature, which is a novel crystal modification of the present invention characterized by a specific X-ray diffraction pattern of the compound represented by the above formula (1), and we have completed the present invention.

The novel β-crystal of the present invention is also characterized that a tar-like substance or coagulation are not formed at high temperature more than 95° C. at which dyeing is performed on synthetic fiber because of said thermal stability. And the novel β-crystal of this invention is characterized by having plural, sharp peaks in the powder X-ray diffractometry shown in FIGS. 1 and 2. This differs from α-crystal having dull peaks in the powder X-ray diffractometry shown in FIG. 3. Particularly, the β-crystal is characterized by having three sharp peaks at diffraction angles (2θ) [°] 8.3, 23.2 and 25.2 in the powder X-ray diffractometry with Cu-Kα line.

The present invention relates to β-crystal of the compound represented by the following formula (1), which has a superior stability of dispersion at high temperature.

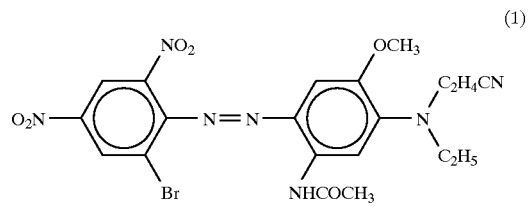

Furthermore, the present invention relates to β-crystal of the compound represented by the formula (1) mentioned above having plural sharp peaks in the powder X-ray diffractometry with Cu-Kα line.

More detailed, the present invention relates to β-crystal of the compound represented by the formula (1) mentioned above having at least three sharp peaks at diffraction angles (2θ) [°] 8.3, 23.2 and 25.2 in the powder X-ray diffractometry with Cu-Kα line.

The present invention relates to a process for producing said β-crystal characterized by heating α-crystal represented by the formula (1) at a temperature higher than 15° C. in water, a water-soluble organic solvent or water containing an anionic or nonionic surface active agent.

The present invention relates to a dyestuff composition containing β-crystal.

Further also, the present invention relates to a process for dyeing hydrophobic fibers, which is characterized by using the above β-crystal.

(With diffraction angle (2θ) as abscissa and diffraction intensity as ordinate)

Figure 3:
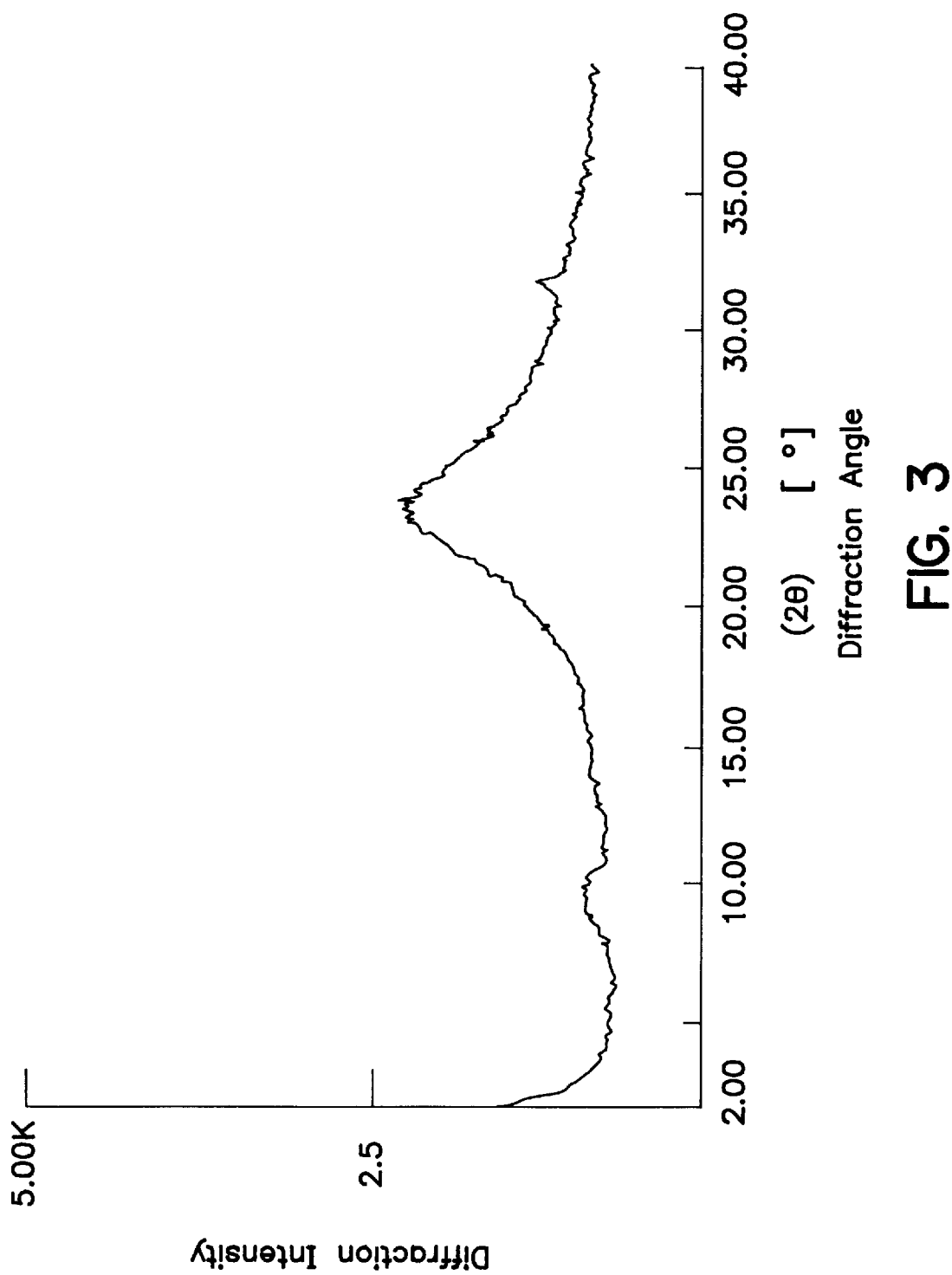

FIG. 3 is an X-ray diffraction pattern of thermally unstable α-crystal (amorphous).

(With diffraction angle (2θ) as abscissa and diffraction intensity as ordinate)

DETAILED DISCLOSURE OF THE INVENTION

β-crystal of the compound represented by the formula (1) is able to be produced by heating a wet cake or a dry cake of well-known α-crystal in at least one solvent selected from the group consisting of water, a water-soluble organic solvent and water containing an anionic or nonionic surface active agent at a temperature higher than 15° C., preferably higher than 40° C., more preferably higher than 70° C. Although α-crystal alone may be used as a starting material, a dyestuff composition containing the compound represented by the above formula (1) and the compound represented by the following formula (2) up to about 30 weight % of it may be used as a starting material.

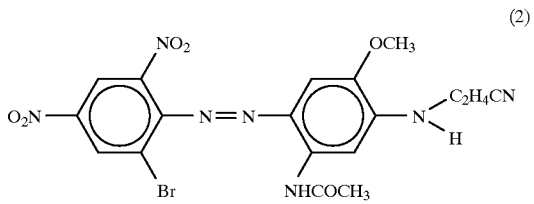

(2)

In a preparation of β-crystal, the solvent may preferably be used in amount of 5–100 w/w to α-crystal used as materials based on dry weight. The treating time may be properly adjusted as required. α-crystal is usually converted to β- of the present invention in the range of about 1 hour to 3 hours usually in the range of 15° C. to 200° C., preferably in the range of 40° C. to 200° C., more preferably in the range of 40° C. to 100° C., most preferably in the range of 70° C. to 100° C. Extending the treating time and maintaining a temperature higher than 100° C. may not provide any problem on the preparation, however, they are economically undesirable.

The water-soluble organic solvent in the preparation for β-crystal may be lower alcohols such as methanol, ethanol, isopropyl alcohol, and butyl alcohol, ethylene glycol monoalkyl ethers such as methyl cellosolve, ethyl cellosolve, and butyl cellosolve, glycols such as ethylene glycol, ketones such as acetone and methyl ethyl ketone, and cyclic ethers such as tetrahydrofuran and dioxane.

The anionic surface active agent may be sodium salt of β-naphthalenesulfonic acid-formalin condensate, and sodium lignin sulfonate etc. The nonionic surface active agent may be sorbitan fatty acid esters, polyoxyethylene sorbitan fatty acid esters, polyoxyethylene fatty acid esters, polyoxyethylene alkyl ethers, polyoxyethylene alkyl phenyl ethers, and polyoxyethylene alkylamines. These may be used alone or in combination with more than two.

The conversion of α-crystal into β-crystal is usually performed on the wet cake obtained by filtration and washing after coupling reaction or dry cake obtained after drying of the wet cake. Alternatively, without filtration it is also possible to heat the reaction solution itself which completes the coupling reaction or the solution after neutralization or after addition of a water-soluble organic solvent or an anionic or nonionic surface active agent. It is also possible to convert α-crystal into β-crystal by adding the solvent or surfactant previously to a coupling solution and by carrying out heating after completion of the coupling reaction if the solvent or surfactant has no adverse effect on the coupling reaction. The amount of the water-soluble organic solvent is usually 5–50 wt % of water. The amount of the surfactant is usually 0.1–50 wt % of water or water-organic solvent mixture.

The completion of conversion of α-crystal into β-crystal can be readily confirmed by observing an X-ray diffraction pattern.

α-crystal of the compound represented by the formula (1) can be obtained according to the known process by diazotizing 6-bromo-2,4-dinitroaniline and subsequent coupling with 3-[N-(2-cyanoethyl)-N-ethylamino]-4-methoxyacetanilide in an acid medium.

β-crystal of the present invention is characterized by not only stability of dispersion in high temperature but having plural sharp peaks in the powder X-ray diffractometory. And more concretely, β-crystal is characterized by the X-ray diffraction pattern having at least three sharp peaks at diffraction angles (2θ) [°] 8.3, 23.2 and 25.2 in the powder X-ray diffractometry with Cu-Kα line.

Further concretely, the crystal is characterized by an X-ray diffraction pattern having peaks at diffraction angles (2θ) [°] 8.3, 9.0, 21.1, 22.9, 23.2, 24.2, 25.2, and 26.1 obtained by the powder X-ray diffractometry with Cu-Kα line. (See FIG. 1, referred to β-1 crystal hereinafter) or by an X-ray diffraction pattern having peaks at diffraction angles (2θ) [°] 8.3, 10.4, 18.8, 23.2, 25.2, and 28.2 obtained by the powder X-ray diffractometry with Cu-Kα line. (See FIG. 2 referred to β-2 crystals hereinafter.)

Incidentally, the diffraction angles have a normally permissible error of ±0.2°.

The dyestuff of β-crystal structure in the present invention can be used to dye fibers, such as polyester fiber, triacetate fiber, triacetate fiber, diacetate fiber, and polyamide fiber, and their blends with themselves or blend-fibers or blend-textiles of said fibers with regenerated fiber (such as rayon) or natural fiber (such as cotton, silk, and wool).

The dyestuff in the form of cake is thoroughly ground by wet process using an attritor, sand mill, or sand grinder in an aqueous medium. The aqueous medium may contain a dispersing agent such as sodium salt of β-naphthalenesulfonic acid-formalin condensate, sodium salt of Schaffer's acid-formalin condensate, sodium salt of alkylnaphthalenesulfonic acid-formalin condensate, sodium lignin sulfonate, sodium alkylnaphthalenesulfonate, sulfate ester of higher alcohol, and sodium higher alkylbenzenesulfonate. The dispersing agent is used usually in an amount of 1–5 times the weight of the dyestuff.

The ground dyestuff in the form of paste may be used as such or dried by spray drying to give fine particles. The ground dyestuff is added into a dye bath for dip dyeing or made into a printing paste for printing. The dip dyeing may be accomplished by dyeing methods such as high-temperature dyeing, carrier dyeing, or thermosol dyeing. β-crystal of the compound represented by the formula (1) may be used in combination with other dyes, such as yellow dye and red dye, and additives.

Actual dyeing may be carried out in the following manner. It is preferable to dip hydrophobic fiber in an aqueous medium under pressure at 105° C. or above, preferably at 110–140° C. for dyeing hydrophobic fiber by dipping methods. Carrier dyeing may be carried out in the presence of a carrier, such as o-phenylphenol and trichlorobenzene, at a comparative high temperature, for example, in boiling water. Furthermore, thermosol dyeing may be carried out by thermosol process, that is, by padding the substrate with a dye dispersion and subsequent dry heat treatment at 150–230° C. for 0.5–1 minute. Printing may be carried out by printing the substrate with a printing paste and subsequent steaming or thermosol treatment. The printing paste is prepared from the dispersible dye and a gum, which includes natural gum such as locust bean gum and guar gum, processed gum, for example cellulose derivatives such as carboxymethylcellulose and processed locust bean gum, and synthetic gum such as polyvinyl alcohol and polyvinyl acetate.

β-crystal in the form of ground fine particle should be used in an amount of 1–15% o.w.f. (based on fiber weight) of on dry basis.

The dyestuff of the present invention can be made into a dispersion which is stable at a high temperature more than 80° C., preferably more than 95° C., more preferably 95–230° C. In addition, it permits even dyeing and good fastness while keeping its inherent dyeing characteristics (hue, build-up performance, color value, etc.).

The present invention provides a dyestuff represented by the formula (1) in crystal modification (β-crystal) which has good dispersibility and stability at high temperatures compared with prior α-crystal.

EXAMPLES

To further illustrate the invention, and not by way of limitation, the following examples are given. Quantities (% and parts) are based on weight.

Example 1

Figure 2:
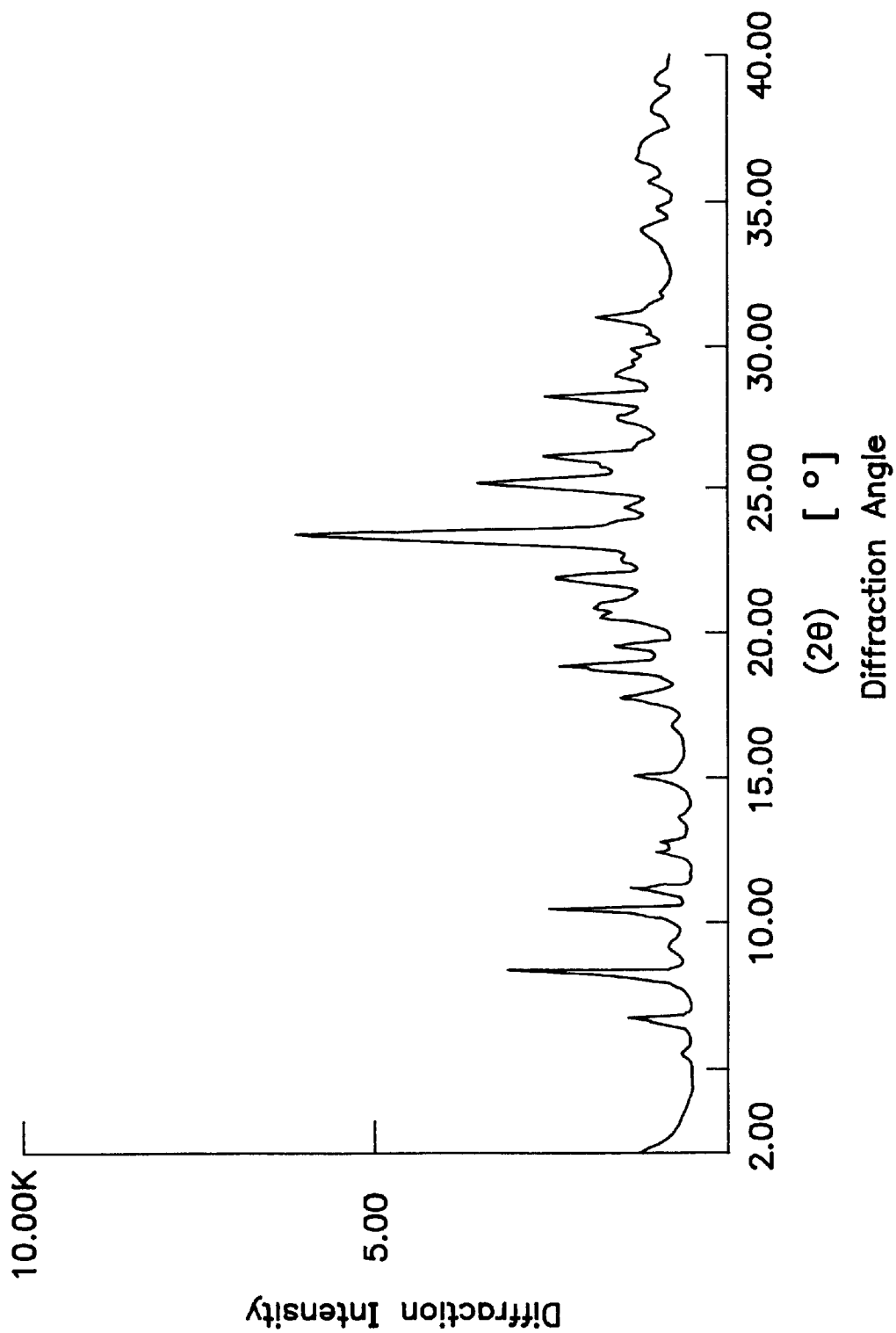
FIG. 2 is the X-ray diffraction pattern of thermally stable β-2 crystal.

A quantity of 13.1 parts of 2,4-dinitro-6-bromoaniline was heated with stirring at 45–50° C. for 2 hours in a mixture composed of 18.5 parts of conc. sulfuric acid and 16.2 parts of 40% nitrosylsulfuric acid. There was obtained a diazo solution of 2,4-dinitro-6-bromoaniline. A quantity of 13.1 parts of 3-[N-(2-cyanoethyl)-N-ethylamino]-4-methoxyacetanilide was dissolved in 110 parts of 5% aqueous solution of sulfuric acid. To this solution (kept at 0–5° C.) was added dropwise the above-mentioned diazo solution for coupling reaction. During this procedure the coupling reaction solution was kept at pH 3–4 with 25% aqueous solution of sodium hydroxide which was added dropwise adequately and also at 0–5° C. with ice. After the completion of the coupling reaction, the reaction product was filtered out and washed. Thus there was obtained a dyestuff in the form of cake in an amount of 25.7 parts (on a dry basis). A part of this dyestuff cake was took off and powder X-ray diffraction of the cake was examined and the cake gave an X-ray diffraction pattern as shown in FIG. 3, which suggest that the dyestuff is of amorphous α-crystal. The dyestuff cake was added into 500 parts of water and heated with stirring at 75–85° C. for 1 hour. After the heat treatment, the dyestuff was filtered out and examined by powder X-ray diffractometry. There was obtained an X-ray diffraction pattern as shown in FIG. 2, which suggests that the dyestuff is of β-crystal (β-2).

Example 2

A mixture composed of 21 parts (on a dry basis) of of α-crystal of the dyestuff (in the form of wet cake) obtained in the same manner as in Example 1, 21 parts of "Demol N" (an anionic surfactant, a product of Kao Corporation), 28 parts of "Demol C" (an anionic surfactant, a product of Kao Corporation) and 300 parts of water were heated at 70–75° C. for 1 hour.

A small portion of the mixture was filtered out, washed with water, and dried under reduced pressure. The resulting sample gave an X-ray diffraction pattern (almost identical with that shown in FIG. 2) which suggests that the sample is of β-crystal (β-2). The heat-treated mixture was ground by a sand mill and spray-dried. Three parts of the resulting dye composition was added into 3000 parts of water to prepare a dye bath, which was adjusted to pH 4.5 with acetic acid and sodium acetate. In this dye bath was dipped 100 parts of polyester white cloth for dyeing at 130° C. for 60 minutes. On soaping, rinsing, and drying, there was obtained a cloth evenly dyed in dark blue.

Example 3

A mixture composed of 21 parts (on a dry basis) of of α-crystal of the dyestuff (in the form of wet cake) obtained in the same manner as in Example 1, 24 parts of "Demol N", 24 parts of "Pearlex DP" (an anionic surfactant, a product of Nippon Seishi Corporation) and 300 parts of water were heated at 70–75° C. for 1 hour.

Figure 1:
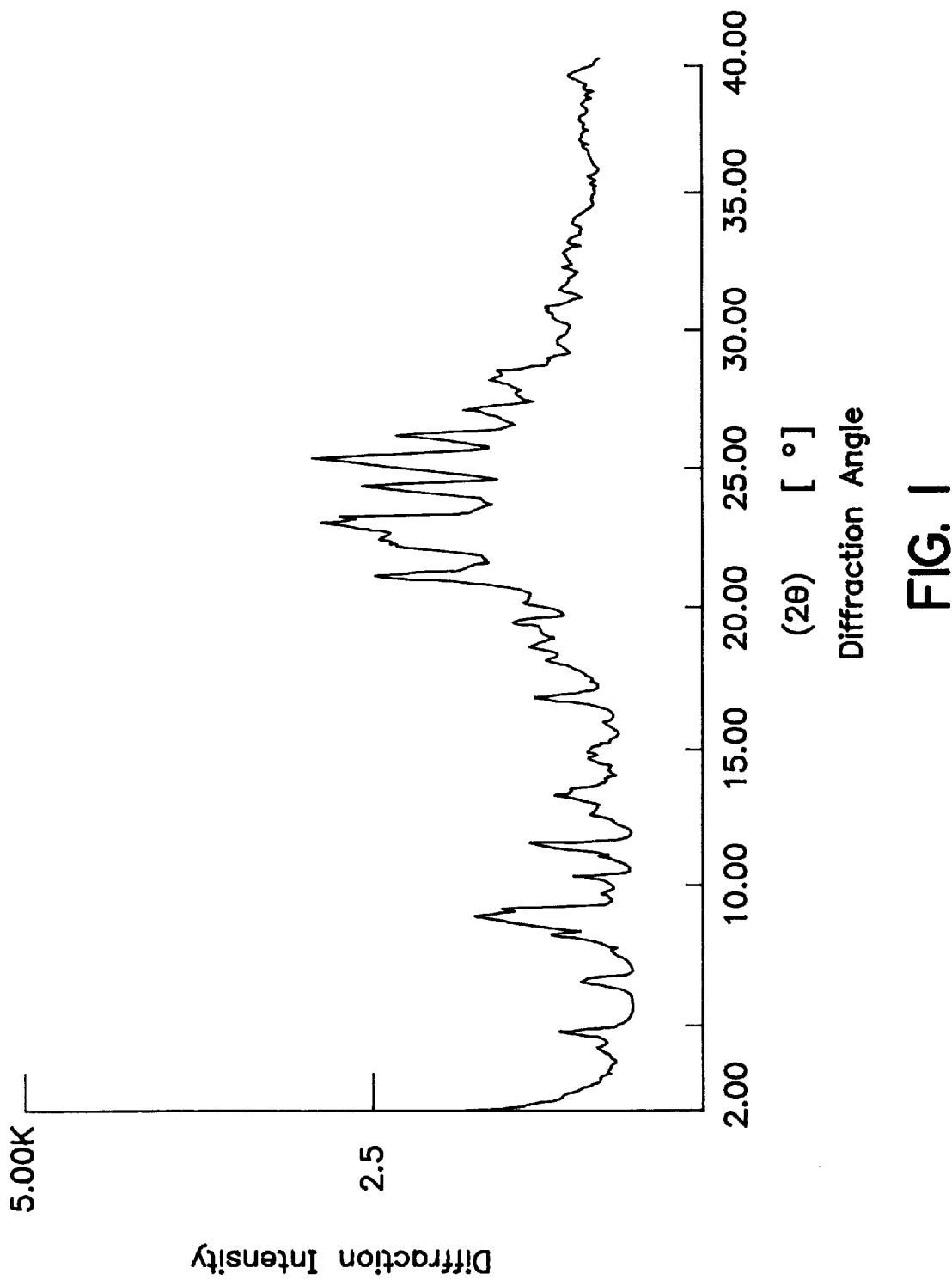
FIG. 1 is the X-ray diffraction pattern of thermally stable β-1 crystal.

A small portion of the mixture was filtered out, washed with water, and dried under reduced pressure. The resulting sample gave an X-ray diffraction pattern as shown in FIG. 1, which suggests that the sample is of β-crystal (β-2). The heat-treated mixture was ground by a sand mill and spray-dried. Three parts of the resulting dye composition was added into 3000 parts of water to prepare a dye bath, which was adjusted to pH 4.5 with acetic acid and sodium acetate. In this dye bath was dipped 100 parts of polyester white cloth for dyeing at 130° C. for 60 minutes. On soaping, rinsing, and drying, there was obtained a cloth evenly dyed in dark blue.

Example 4

The same procedure as in Example 3 was repeated except that the surface active agent (dispersing agent) was replaced by 7.5 parts of "Rheodol TWO-120" (a polyoxyethylene sorbitan nonionic surfactant, a product of Kao Corporation). There was obtained β-crystal (β-2) of the dyestuff represented by the formula (1).

Example 5

The same procedure as described in Example 3 was repeated except that the surface agent (dispersing agent) was replaced by 30 parts of ethylene glycol monomethyl ether. There was obtained β-crystal (β-1) of the dyestuff represented by the formula (1).

Example 6

Coupling was carried out in the same way as described in Example 1, and the resulting solution was heated under stirring at 70–75° C. for 1 hour. After filtration and rinsing, there was obtained β-crystal (β-2) of the dyestuff represented by the formula (1).

Example 7

A diazo solution was prepared in the same manner as described in Example 1 and a prescribed coupler was dissolved in 5% aqueous solution of sulfuric acid. "Rheodol TWO-120" (1.25 parts) was added, and the diazo solution was added dropwise for coupling reaction at 0–5° C. During this procedure, the coupling reaction solution was kept at pH 3–4 by adding dropwise 25% aqueous solution of sodium hydroxide. After the completion of coupling reaction, the reaction solution was kept at 15–25° C. for 1 hour. The reaction product was filtered out and washed with water. There was obtained β-crystal (β-2) of the dyestuff represented by the formula (1).

Example 8

A diazo solution was prepared in the same manner as described in Example 1. In a 5% aqueous solution of sulfuric acid was dissolved a mixture of 3-[N-(2-cyanoethyl)-N-ethylamino]-4-methoxyacetanilide (85%), which is an object component for the coupler, and 3-[N-(2-cyanoethyl) amino]-4-methoxyacetanilide (13%), which is an unreacted component at the time of coupler synthesis. The percentage is proportional to the areas of the high-performance liquid chromatogram (HPLC, detector: uv-254 nm). With the reaction temperature kept at 0–5° C., the above-mentioned diazo solution was added dropwise for coupling reaction. During this procedure, the coupling reaction solution was kept at pH 3–4 with 25% aqueous solution of sodium hydroxide added dropwise adequately. The reaction system was stirred at room temperature for 2 hours and then heated to 75–80° C. and stirred at this temperature for about 1 hour. The reaction product was filtered out and washed with water. There was obtained a dyestuff crystal mixture which gave an X-ray diffraction pattern which is identical with that shown in FIG. 2, and the dyestuff mixture is of β-crystal (β-2). The dyestuff mixture was analyzed by HPLC. It was found to be composed of 2'-(2-bromo-4,6-dinitrophenylazo)-5'-(N-(2-cyanoethyl)-N-ethylamino)-4'-methoxyacetanilide (79.7% as the major constituent) and 2'-(2-bromo-4,6-dinitophenylazo)-5'-[N-(2-cyanoethyl)amino]-4'-methoxyacetanilide (19.4% as the secondary constituent). The percentage is proportional to the areas of the high-performance liquid chromatogram (detector: vis-590 nm).

Comparative Test

A sample (21 parts each) of α-crystal or β-crystal of the compound represented by the formula (1) was ground together with "Demol N" (21 parts) and "Demol C" (28 parts) by wet process using a sand mill and thereafter dried under reduced pressure to obtain a dispersible dyestuff composition. The dyestuff compositions obtained were tested for (1) heat coagulation and (2) casing spot to compare their thermal stability in a method mentioned below. The result of using β-crystal of this invention is Rank 3 in heat coagulation test which means that some coagulates are found, and Rank 4 in casing spot test which means that a few spots is found. On the other hand, the results of using α-crystal in heat coagulates test and casing spot test are Rank 1 (a large amount of coagulate on filter paper) and Rank 1 (a large number of spots) respectively. These results are shown in Table 1 below.

TABLE 1

| Crystal type | Heat coagulation | Casing spot |
| --- | --- | --- |
| β-crystal | Rank 3 | Rank 4 |
| α-crystal | Rank 1 | Rank 1 |

Details of the each test method are as follows.
(1) Heat coagulation test

A sample (0.5 part) of the dyestuff composition is dispersed into 100 parts of water and the dispersion is adjusted to pH 4.5 with acetic acid and sodium acetate. The dispersion is heated from 60° C. to 130° C. over 40 minutes and is kept at 130° C. for 10 minutes. After cooling to 95° C. over 5 minutes, it is filtered under reduced pressure through filter paper for quantitative analysis (Toyo filter paper No. 5A). The sample is rated according to the following criterion by observing the amount and state of residues remaining on filter paper.

Rank 5: no coagulate on filter paper.

Rank 4: a small amount of coagulate on filter paper.

Rank 3: some coagulate on filter paper.

Rank 2: a considerable amount of coagulate on filter paper.

Rank 1: a large amount of coagulate on filter paper.

(2) Casing spot test

A sample (0.25 part) of the dyestuff composition is dispersed into 180 parts of water and the dispersion is adjusted to pH 4.5 with acetic acid and sodium acetate. In this dispersion (dye bath) is immersed polyester jersey (10 parts). The dye bath is heated from 60° C. to 130° C. over 40 minutes by using a color pet dyeing machine. The dye bath is kept at 130° C. for 10 minutes and then cooled to 60° C. The sample is rated according to the following criterion by observing aggregate sticking to that part of the substrate which is in contact with the substrate holder.

Rank 5: no spots at all.

Rank 4: a few spots.

Rank 3: some spots.

Rank 2: a considerable number of spots.

Rank 1: a large number of spots.

What is claimed is:

1. A β-crystalline form of the compound as represented by formula (1)

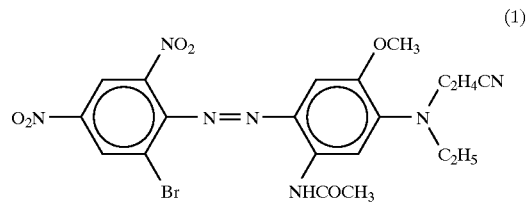

which is stable at high temperature, said crystal being characterized by an X-ray diffraction pattern having sharp peaks at diffraction angles (2θ) [°] 8.3, 23.2 and 25.2 obtained by powder X-ray diffractometry with Cu-Kα line.

2. A β-crystalline form represented by the formula (1) as defined in claim 1, said β-crystal being characterized by an X-ray diffraction pattern having peaks at diffraction angles (2θ) [°] 8.3, 9.0, 21.1, 22.9, 23.2, 24.2, 25.2, and 26.1 obtained by powder X-ray diffractometry with Cu-Kα line.

3. A β-crystalline form represented by the formula (1) as defined in claim 1, said, β-crystal being characterized by an X-ray diffraction pattern having peaks at diffraction angles (2θ) [°] 8.3, 10,4, 18.8, 23.2, 25.2, and 28.2 obtained by powder X-ray diffractometry with Cu-Kα line.

4. A process for producing a β-crystalline form as defined in any one of claims 1, 2 or 3, said process comprising heating the amorphous form of the compound represented by the following formula (1) at a temperature higher than 15° C. in water, a water-soluble organic solvent, or water containing an anionic or nonionic surface active agent:

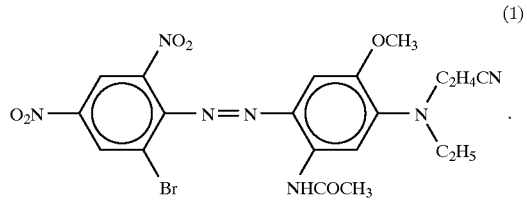

(1)

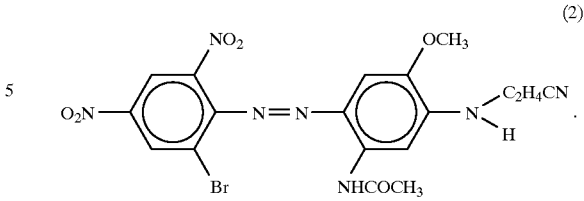

(2)

5. A dyestuff composition comprising the compound having β-crystalline form in any one of claims 1, 2 or 3.

6. The dyestuff composition of claim 5, which is a mixture of dyestuffs of the formula (1) and a dyestuff represented by the formula (2) below in an amount less than 30%:

7. A process for dyeing hydrophobic fibers, said process comprising applying to said fibers the β-crystalline form as defined in any one of claims 1, 2 or 3.

8. A process for dyeing hydrophobic fibers, said process comprising applying to said fibers the dyestuff composition of claim 5.

9. A process for dyeing hydrophobic fibers, said process comprising applying to said fibers the dyestuff composition of claim 6.

* * * * *